(12) United States Patent
Kurtz

(10) Patent No.: US 7,733,209 B2
(45) Date of Patent: Jun. 8, 2010

(54) HIGH TEMPERATURE PRESSURE TRANSDUCER EMPLOYING A METAL DIAPHRAGM

(75) Inventor: Anthony D. Kurtz, Saddle River, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 923 days.

(21) Appl. No.: 11/453,445

(22) Filed: Jun. 15, 2006

(65) Prior Publication Data
US 2007/0289388 A1    Dec. 20, 2007

(51) Int. Cl.
*G01L 1/22*    (2006.01)
(52) U.S. Cl. .................. 338/2; 338/4; 338/47; 73/576; 73/718
(58) Field of Classification Search .............. 338/2, 338/4, 36, 39, 47, 99; 73/576, 718, 724, 73/714
See application file for complete search history.

(56) References Cited

U.S. PATENT DOCUMENTS

| 5,286,671 A | 2/1994 | Kurtz et al. |
| 5,973,590 A | 10/1999 | Kurtz et al. |
| 6,330,829 B1 * | 12/2001 | Kurtz et al. ................... 73/717 |
| 6,595,066 B1 * | 7/2003 | Kurtz et al. ................... 73/721 |

* cited by examiner

*Primary Examiner*—Kyung Lee
(74) *Attorney, Agent, or Firm*—Troutman Sanders LLP; James E. Schutz; Filip A. Kowalewski

(57) ABSTRACT

A pressure transducer includes a diaphragm, having an active region, and capable of deflecting when a force is applied to the diaphragm; and a sensor array disposed on a single substrate, the substrate secured to the diaphragm, the sensor array having a first outer sensor near an edge of the diaphragm at a first location and on the active region, a second outer sensor near an edge of the diaphragm at a second location and on the active region, and at least one center sensor substantially overlying a center of the diaphragm, the sensors connected in a bridge array to provide an output voltage proportional to the force applied to the diaphragm. The sensors are dielectrically isolated from the substrate.

9 Claims, 4 Drawing Sheets

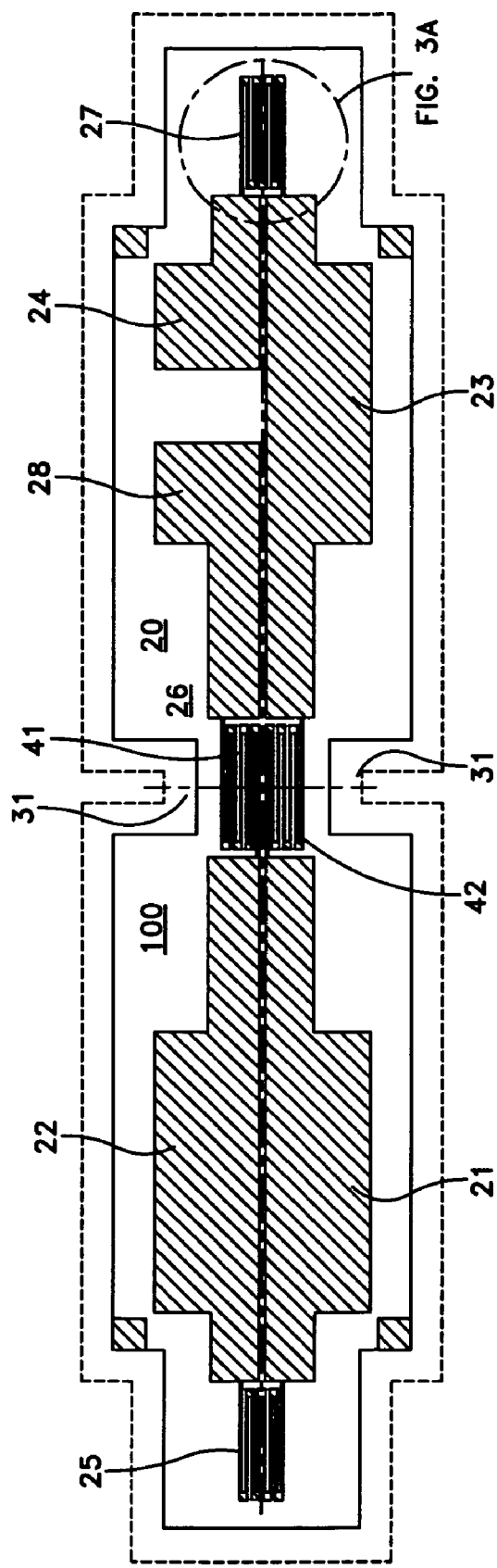
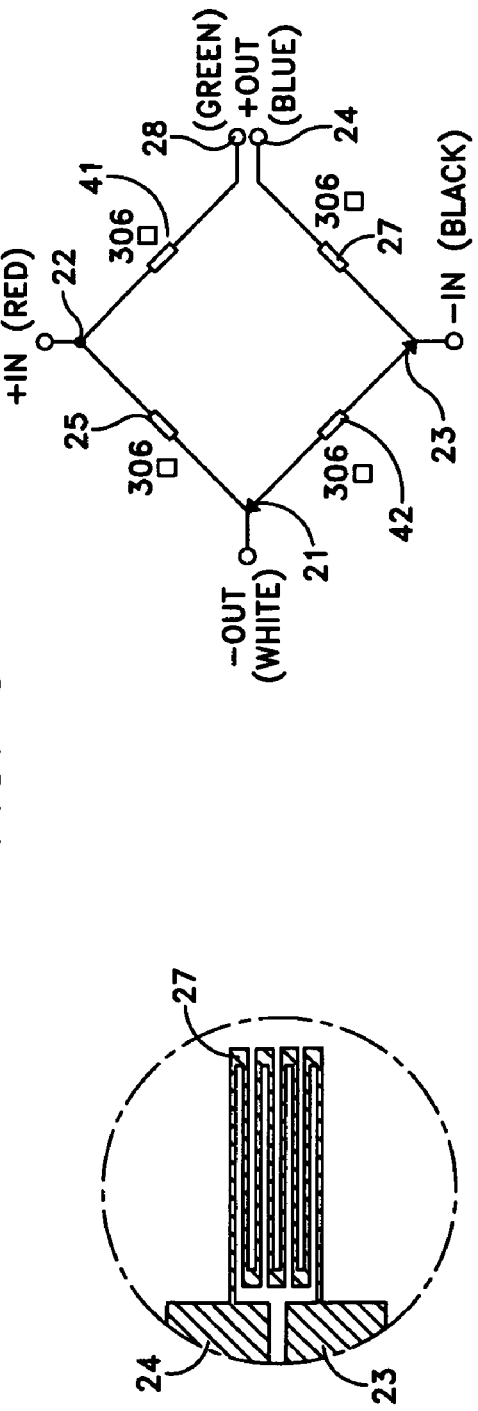
FIG. 3
FIG. 3A
FIG. 3B

HIGH TEMPERATURE PRESSURE TRANSDUCER EMPLOYING A METAL DIAPHRAGM

FIELD OF THE INVENTION

This invention relates to pressure transducers and more particularly to a high temperature pressure transducer.

BACKGROUND OF THE INVENTION

It has been a desire to provide pressure transducers which can operate at high temperatures and which basically are simple to construct. The prior art is replete with patents and devices which can operate at relatively high temperatures. Such devices include silicon sensors which operate for example at temperatures of 600° C. or higher. Other patents which are assigned to the assignee herein, namely Kulite Semiconductor Products, Inc., depict silicon carbide transducers which are capable of extremely high temperature operation. The prior art is replete with patents which utilize metal as deflecting diaphragms. Onto these metal diaphragms are affixed piezoresistive or other type of sensors. The diaphragms being made of metal are capable of operating at high temperatures. Sensors affixed to the diaphragm can include wire strain gauges or other types of semiconductor strain gauges. Such gauges have to be placed onto the diaphragm in specific positions and each individually affixed to the diaphragm at specific positions. Accordingly, the placement of the sensors on the diaphragm can be a time consuming task.

In the prior art, there were two principal methods of making miniature high temperature pressure transducers. In the first method, a thin metallized isolation diaphragm was mounted in front of the sensor and the pressure was transmitted to the sensor by a small volume of oil. As pressure was applied to the isolation diaphragm, pressure was transmitted to the sensor by the oil, which is a non-compressible fluid. As long as the oil retains its property as a non-compressible fluid, such a pressure transducer operates properly. However, as the temperature increases, the vapor pressure of the oil increases to a point where the oil no longer transmits the pressure to the sensor, setting an upper temperature limit on the operation of the transducer. In the second method, as individual gauges are affixed to the diaphragm, using either a high temperature cement or glass. In this method the only dielectric isolation between the gauge and the metal diaphragm is the cement itself. Any variations in the thickness of the cement can cause electrical breakdowns at relatively low temperatures, causing the transducer to fail. Furthermore, if the individual gauges are made from silicon, in order to obtain sufficient resistance, the gauge must be rather long and exhibit rather high resistivity. Thus it becomes difficult to place the individual gauge in a resistor in a region of high stress. As the temperature is increased, the relatively high resistivity material used for the sensor changes its value at a non-linear rate as the temperature is increased to a higher value, making thermal compensation very difficult. Moreover, each individual gauge must be separately applied to the diaphragm, or alternatively, if the various sensors are interconnected prior to application to the diaphragm, the structure is complex, fragile, and difficult to handle, so that the resulting transducers are of dubious quality.

SUMMARY OF THE INVENTION

A pressure transducer in accordance with an embodiment of the invention includes a diaphragm, having an active region, and capable of deflecting when a force is applied to the diaphragm; and a sensor array disposed on a single substrate, the substrate secured to the diaphragm, the sensor array having a first outer sensor near an edge of the diaphragm at a first location and on the active region, a second outer sensor near an edge of the diaphragm at a second location and on the active region, and at least one center sensor substantially overlying a center of the diaphragm, the sensors connected in a bridge array to provide an output voltage proportional to the force applied to the diaphragm.

A sensor array in accordance with an embodiment of the invention includes an elongated substrate having a top and a bottom surface and opposing ends, and having a sensor array located on the top surface, a first semiconductor sensor on the top surface close to one of the opposing ends and a second semiconductor sensor on the top surface close to the other of the opposing ends, and two semiconductor sensors positioned substantially at a center of the substrate, the sensors connected together by contact areas located on the substrate to form a bridge configuration.

BRIEF DESCRIPTION OF THE FIGURES

FIG. 3 is a top plan view of a sensor array of the transducer of FIG. 2, taken along line 3-3 of FIG. 2.

FIG. 3A is an enlarged view of the portion of FIG. 3 as indicated in FIG. 3.

FIG. 3B is a schematic showing a Wheatstone bridge array formed by the sensor array of FIG. 3.

DETAILED DESCRIPTION OF THE INVENTION

Figure 1:
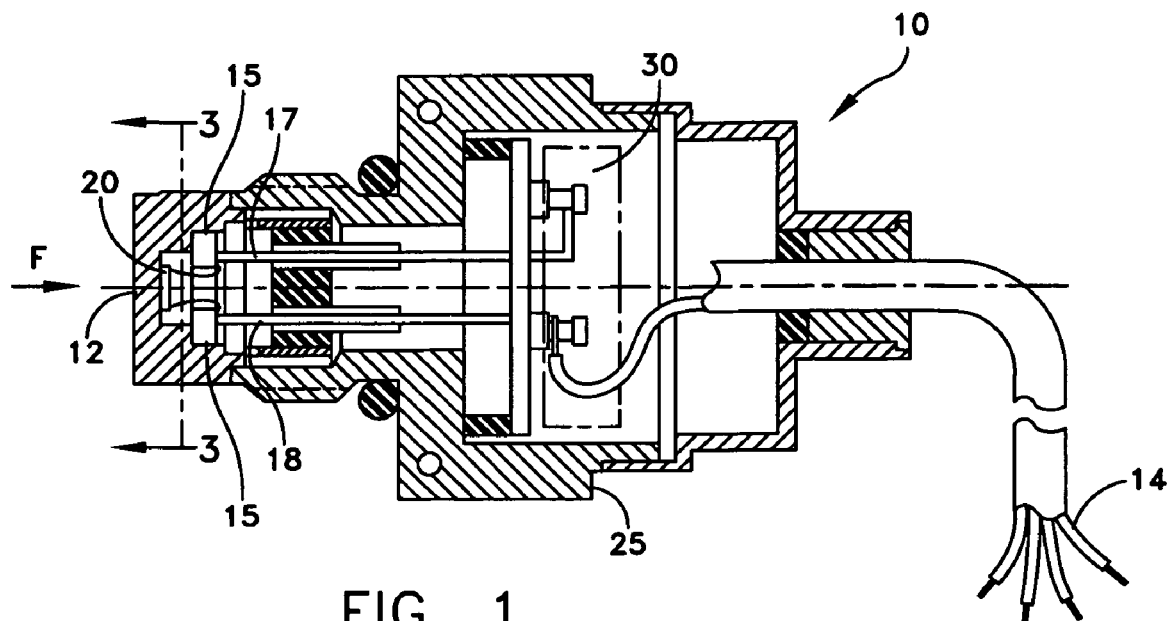
FIG. 1 is a cross-sectional view of a pressure transducer taken through line 1-1 of FIG. 2 and in accordance with an embodiment of this invention.
Figure 2:
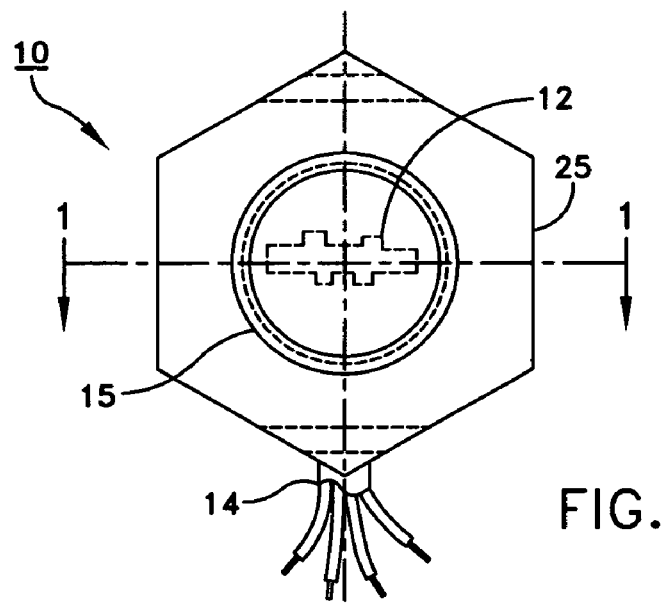
FIG. 2 is a top view of a pressure transducer in accordance with an embodiment of this invention.

Referring to FIGS. 1 and 2 there is shown a pressure transducer in accordance with an embodiment of the present invention. FIG. 2 depicts a pressure transducer 10, which has a housing 25 and which has a diaphragm 12. FIG. 1 depicts a cross-sectional view taken through line 1-1 of FIG. 2. Diaphragm 12 may be of metal and may be of uniform thickness. The particular thickness, radius and material may be selected depending on the particular application. Diaphragm 12 may be supported exclusively at a circumference thereof, and may be supported around the entire circumference thereof. In the absence of an applied force, diaphragm 12 is planar or substantially planar. In the presence of an applied force, diaphragm 12 is capable of deflection. An active area of diaphragm 12 deflects upon application of a force. Diaphragm 12 may be a continuous end wall of a closed cylindrical member 15 having an inner diameter approximately one-half that of its outer diameter. If closed cylindrical member 15 is circular, diaphragm 12 may be circular. FIG. 2 also depicts in dashed lines sensor array 20. Diaphragm 12 has a top surface external to transducer 10, and a bottom surface interior to transducer 10. Sensor array 20 is affixed to the bottom surface of the active area of diaphragm 12.

As one can see from FIG. 1, sensor array 20 is completely isolated from the environment external to transducer 10 by closed cylindrical member 15. Leads from sensor array 20 are directed to terminal pins, 17 and 18, which pins connect with connecting terminal port 30, which is in turn connected to output connector 14.

Referring now to FIG. 3, sensor array 20 contains four sensors 25, 27, 41, 42, which are interconnected to form a bridge circuit, such as a Wheatstone bridge. Sensors 25, 27, 41, 42 may be piezoresistive devices. As explained below in greater detail, sensor array 20 is so secured to the bottom surface of diaphragm 12 that deflection of diaphragm 12 causes sensors 25, 27, 41, 42 to change resistance. Thus, resistance changes upon application of an applied force F as shown in FIG. 1 to the top surface of diaphragm 12. Sensor array 20 is dielectrically isolated from diaphragm 12. Sensor array 20 is defined on a substrate. The substrate may be a wafer, such as a single-crystal silicon wafer.

It is well known that when a circular deflecting diaphragm having a clamped edge is exposed to a pressure normal to its surface, the areas near the clamped edge experience compressive stresses while in the central region the area experiences tensile stresses. These stresses are given by the following formula.

$$\sigma = 3P\frac{[a^2(1+v) - r^2(3+v)]}{8t_D^2} \quad (1)$$

Where P is the applied pressure, a is the radius of the diaphragm, v is Poisson's ratio, r is the radius at the location of interest, and $t_D$ is the thickness of the diaphragm.

As can be seen from the dashed line depiction in FIG. 2, sensor array 20 has an elongated form, in which sensor array 20 extends across diaphragm 12 substantially from one edge to an opposing edge, while sensor array 20 is relatively narrow. Sensor array 20 may be in the form generally of a narrow rectangle. The length of sensor array 20 is less than the diameter of an active region of diaphragm 12. Sensor array 20 may be a silicon-on-insulator (SOI) structure. Each sensor may be a P+ piezoresistor element, each separated by an oxide layer from the underlying silicon substrate. The substrate may be affixed to diaphragm 12 by a high temperature glass frit. High temperature glass frits are well known in the art and many patents assigned to the assignee of the present application, Kulite Semiconductor Products, Inc., disclose such frits as well as the composition of the same.

Referring again to FIG. 3, first outer sensor 25 is at, or close to, a first end of sensor array 20. Second outer sensor 27 is at, or close to, a second end of sensor array 20. First and second ends are opposing ends. First and second outer sensors 25, 27, are each positioned near an edge of diaphragm 12, and are on the active region of diaphragm 12. First outer sensor 25 is near an edge of diaphragm 12, at a first location, and second outer sensor 27 is also near an edge of diaphragm 12, at a second location. First outer sensor 25 and second outer sensor 27 are thus both near an edge of diaphragm 12, but at different locations, and may be positioned at locations on opposite edges of diaphragm 12. First center sensor 41 and second center sensor 42 are located at the center of sensor array 20, and overlying or near a center of diaphragm 12. Center sensors 41 and 42 are interconnected on the array by, for example, suitable lead areas which are deposited on the array.

Continuing to refer to FIG. 3, first outer sensor 25 is associated with contact 22 which connects one terminal of first outer sensor 25 to one terminal of first center sensor 41. The other terminal of first outer sensor 25 is connected by a contact 21 to one terminal of second center sensor 42. In a similar manner, one terminal of first center sensor 41 is connected to contact 28. The other terminal of second center sensor 42 is connected to contact 23 which connects to one terminal of second outer sensor 27. The other terminal of second outer sensor 27 is connected to contact 24. The schematic or equivalent diagram of sensor array 20 depicted in FIG. 3 is shown in FIG. 3B. As is evident from FIG. 3B, sensors 25, 27, 41, and 42, which, as noted, are piezoresistors, define a bridge circuit, and more particularly a Wheatstone bridge. Contacts 24, 28 are the output leads of the circuit defined by sensor array 20. Contacts 24, 28, are connected to cable 14 of FIG. 1. The outputs from contacts 24 and 28 may be connected to various devices and circuits for compensating for such factors as variation in temperature. Such devices may include, by way of example, compensating resistors. As one can also see from FIG. 3B, a biasing potential may be applied to contact 22 indicated as +IN; a reference potential may be applied to contact 23 which is indicated as −IN. One output of sensor array 20 is taken from terminal 21, indicated as −OUT, while the other output is taken between terminals 28 and 24, indicated as +OUT.

Shown in FIG. 3A, is an enlarged view of an exemplary embodiment of second end sensor 27. Second end sensor 27 includes a series of interfolded or interconnected lines in a serpentine pattern. Such a series of interfolded or interconnected lines may be advantageous in providing a resistor of relatively high value in a relatively small area. FIG. 3 includes exemplary dimensions of such sensors and of a sensor array 20. By way of example, a piezoresistor employed as a sensor may have dimensions of about 7.6 mils by 2.76 mils. As one can see from FIG. 3 the length of the array from the front of piezoresistor 25 to the back of piezoresistor 27 is typically 91 mils.

The sensor array may be fabricated on a wafer of silicon. The wafer of silicon has deposited thereon a layer of silicon dioxide, and sensors 25, 27, 41 and 42 are deposited on the layer of silicon dioxide by suitable techniques. The sensor array itself may be termed a SOI structure with four P+ resistor elements separated by an oxide layer from the underneath silicon material. Thus, each sensor is dielectrically isolated from the silicon substrate.

Figure 7:
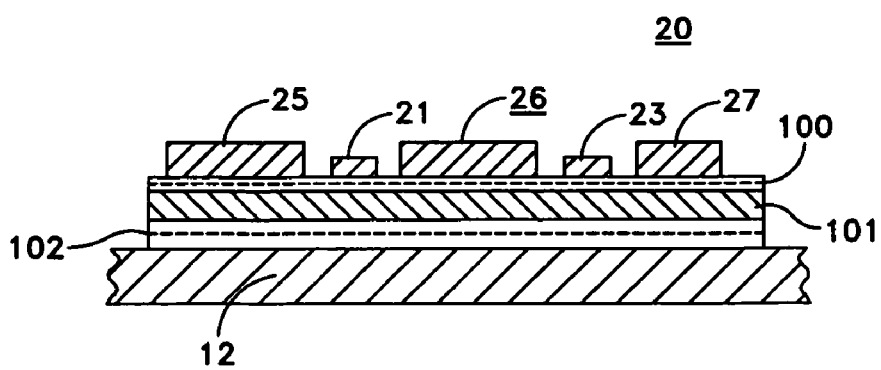
FIG. 7 shows a cross-sectional view of the sensor array of FIG. 3 secured to a metal diaphragm by a high temperature glass frit.

FIG. 7 is a sectional view through diaphragm 12 and sensor array 20. Secured to metal diaphragm 12 is sensor array 20. Sensor array 20 is provided on substrate 101, which may be a wafer of single-crystal silicon, for example. Substrate 101 is secured to diaphragm 12 by a high temperature glass frit 102. Silicon substrate 101 has a layer 100 of silicon dioxide formed thereon. Upon layer 100 of silicon dioxide are first and second outer sensors 25 and 27 and center sensors generally designated 26, and contacts 21, 23.

Methods for fabrication of the devices described herein are well known to those of skill in the art. By way of example, the assignee of the present application, Kulite Semiconductor Corp., has many patents which teach techniques for fabrication of SOI devices which techniques are among those which may be employed to fabricate sensor array 20. See, for example, U.S. Pat. No. 5,973,590 entitled "Ultra Thin Surface Mount Sensor Structures and Methods of Fabrication" issued on Apr. 3, 2001 and assigned to Kulite Semicondcutor Products, Inc. the assignee herein.

Sensor array 20 is defined on substrate 101. The shape and dimensions of substrate 101 are adapted to permit outer sensors 25, 27 to be formed close within the active region of diaphragm 12 and close to the circumference of diaphragm 12, while permitting center sensors 41, 42, to be formed close to the center of diaphragm 12. In the illustrated embodiment, this is accomplished by providing substrate 101 to have a generally rectangular form having a first width, and having an end width, narrower than the first width, at each end to permit outer sensors 25, 27 to be closer to the curved circumference of diaphragm 12. This also enhances the amount of stress induced in outer sensors 25 and 27. In a central region, the width of substrate 101 may be a center width less than the first width, to enhance the amount of stress induced in center sensors 41, 42.

The dimensions described below and illustrated in FIG. 3 provide a non-limiting example of dimensions for a sensor array for use with a circular diaphragm 12 having a diameter of 100 mils. Substrate 101 may be approximately 95 mils long, by approximately 20 mils wide. The sensor array 20 may be 91 mils long by 13.5 mils wide. The areas of reduced width containing outer sensors 25 and 27 may be 12-13 mils wide. The area of reduced width at the center containing center sensors 41, 42 may be about 10 mils wide for a length of about 10 mils.

According to the above-noted stress equation, stress at any given point on diaphragm 12 is dependent on the distance of the point from the center of the diaphragm, and decreases significantly as the distance from the center of the diaphragm decreases. In fact the stress actually changes in sign at about ⅔ of the radius. Thus, as the size of the sensors, particularly along the axis of the diaphragm, is kept relatively small, averaging of the detected stress at any given sensor is reduced. By way of example, in a 100 mil diameter diaphragm, the resistor length may be no more than about 10 mils.

FIG. 3A shows in detail an exemplary structure of outer sensor 27, and terminals coupled to contacts 23 and 24. The other sensors may have the same structure. The line widths of sensor 27 may be extremely small, such as about 0.17 mils. The spacing between each line may be about 0.2 mils. In the illustrated example, since the separation of the lines is on the order of 1 mil, with 5 back and forth lines, the resistance may be about 2000 ohms or in excess of about 2000 ohms, in a width of less than about 5 mils. The width of the resistor as depicted in FIG. 3A is about 3 mils.

One obtains a high resistance in a small area, such as a resistance in excess of 2000 ohms, in an area of about 5 mils by about 7.6 ohms. Such a high resistance is advantageous in that there is relatively little self heating, which tends to provide a more stable transducer.

A variety of methods for fabricating sensor array 20, which may be a dielectrically isolated SOI sensor bridge array as depicted in FIG. 3, are known in the art. One exemplary technique commences with two substrates. The two substrates may be wafers, such as wafers of single crystal silicon. A first wafer may be designated as a pattern wafer and may be selected to optimize the piezoresistive performance characteristics of each of the sensors as 25, 27, 41 and 42. The second wafer also fabricated from silicon is designated as a substrate wafer and acts as a base. The thickness of the substrate wafer is reduced during the process, as described in greater detail below.

An oxide layer, such as oxide layer 100 of FIG. 7, may be thermally grown on the surface of the substrate wafer. Separately, the pattern wafer may be patterned with the piezoresistive pattern of the sensors. The piezoresistive patterns may be diffused to the highest concentration level (solid solubility) in order to achieve the most stable, long term electrical performance characteristics of the sensing network.

Once the pattern and the substrate wafers are appropriately processed, the two wafers may be fusion bonded together using a diffusion enhanced bonding technique. Such a technique is shown in U.S. Pat. No. 5,286,671 designated as "Fusion Bonding Technique for Use in Fabricating Semiconductor Devices" issued on Feb. 15, 1994, to A. D. Kurtz et al and assigned to the assignee herein.

The resulting molecular bond between the two wafers is as strong as the silicon itself. Since both the lines of the sensors and the base are of the same silicon material, there is no thermal mismatch between the two, thus resulting in a very stable and accurate performance characteristic with temperature. The presence of dielectric isolation enables the sensor bridge array to function at very high temperatures without any current leakage effects which are typically associated with ordinary pn junction type devices.

Figure 4:
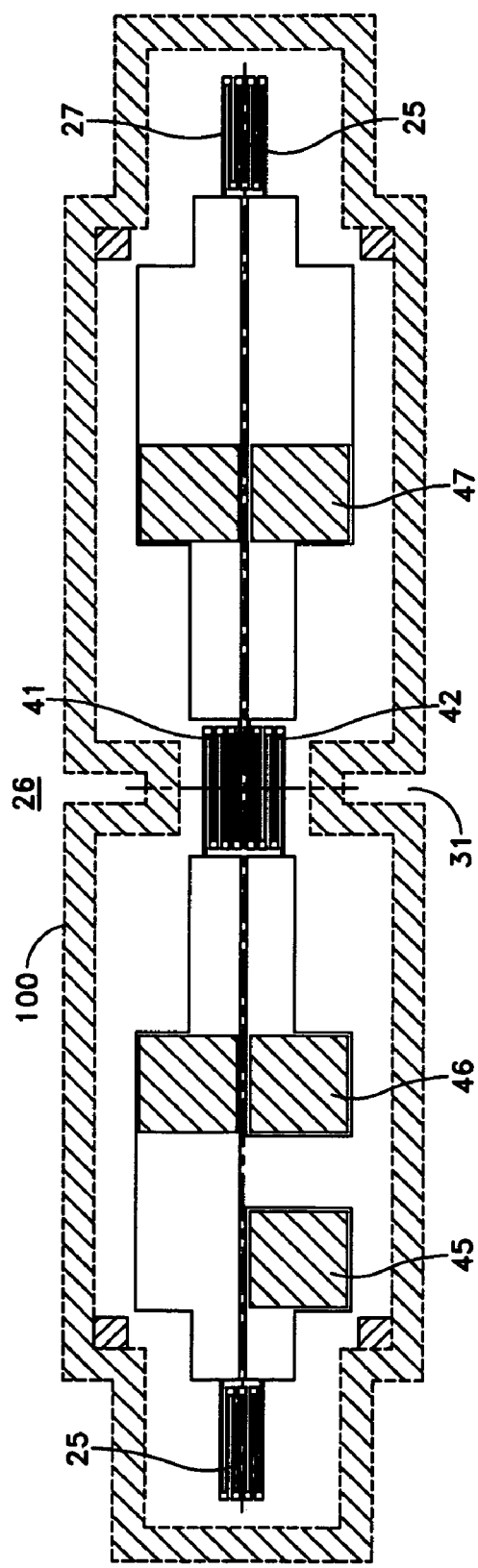
FIG. 4 is a view of a typical masked assembly utilized to produce the array of FIG. 3.

Referring to FIG. 4 there is shown an exemplary masked wafer for forming a sensor array such as array depicted in FIG. 3. As seen in FIG. 4, there is a surrounding layer 100 which may be a P+ material; layer 100 may be used to separate various arrays which are formed on a common wafer as will be explained. FIG. 4 utilizes the same reference numerals as depicted in FIG. 3 to designate the same parts. It is understood that multiple masks may be employed in order to fabricate the entire structure but such techniques are well known to those skilled in the art.

Figure 5:
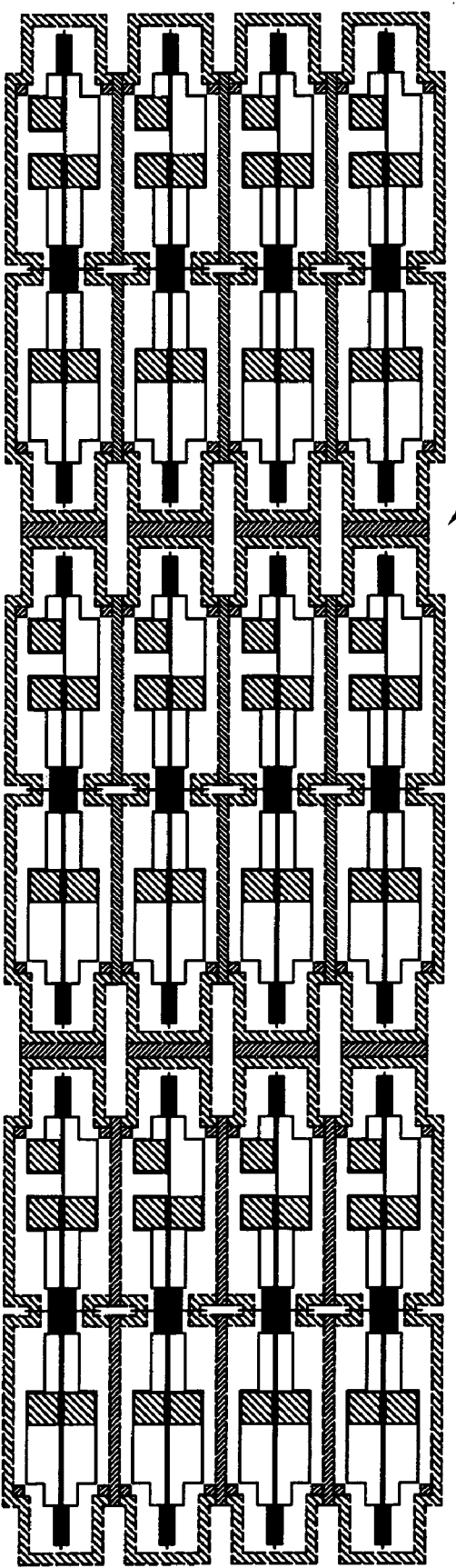
FIG. 5 shows multiple arrays similar to those of FIG. 3 formed on a single semiconductor wafer.

FIG. 5 shows a pattern 500 for multiple sensor arrays all fabricated on a single wafer. The wafer can be sliced to separate the sensor arrays, after measurement of their electrical characteristics, for fabrication of multiple transducers. and which sensor arrays can be separated after their electrical characteristics are measured. In this manner, one can produce numerous sensor arrays as the array of FIG. 3 on one common wafer and select all arrays which are within desired specifications. The fabrication of multiple semiconductor devices or multiple devices on a single wafer is well known. Thus FIG. 5 shows for example a portion of the semiconductor wafer which contains 12 sensor arrays as the array of FIG. 5.

Figure 6:
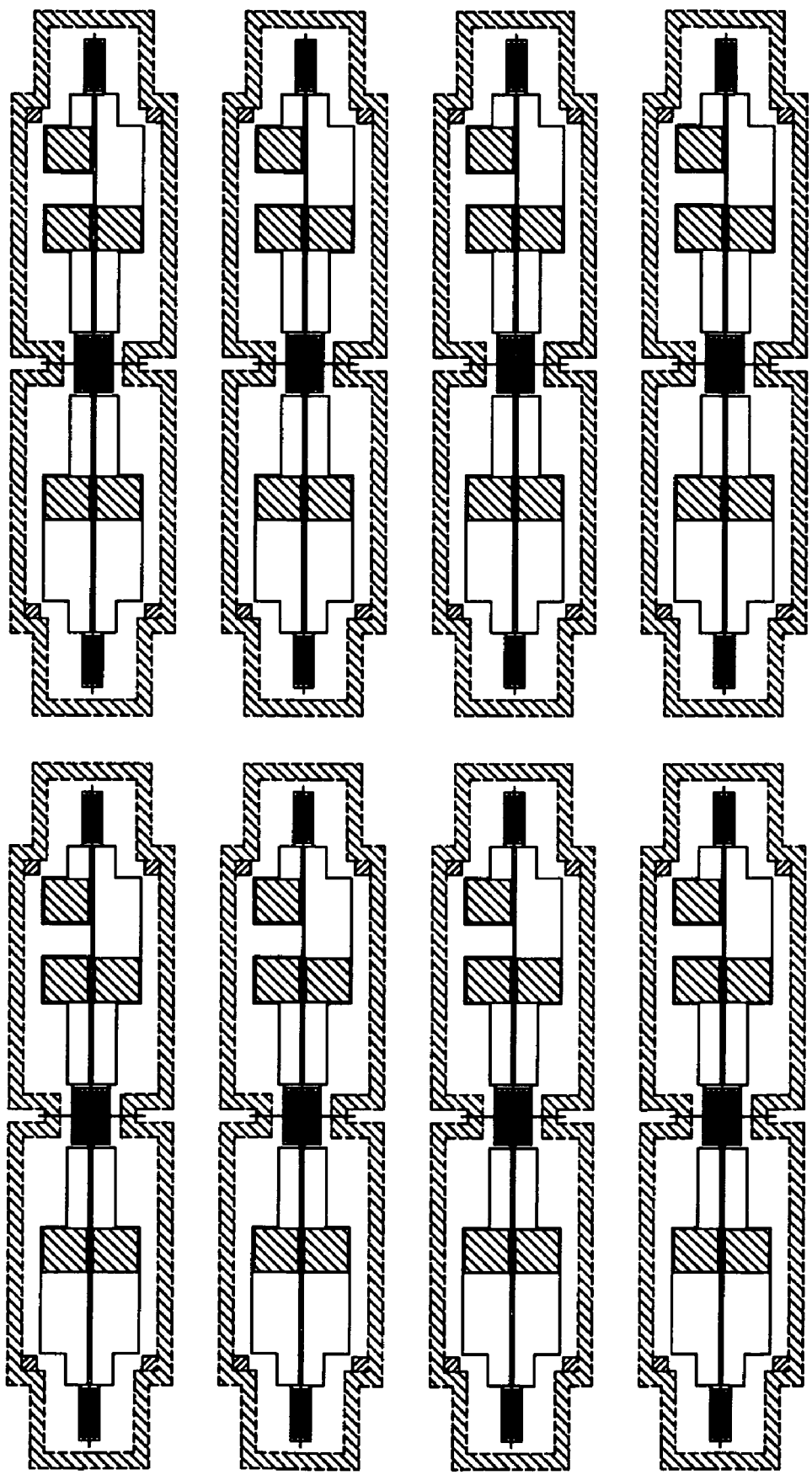
FIG. 6 shows the array of sensor arrays of FIG. 5 separated into individual arrays for use on separate metal diaphragms.

FIG. 6 shows such sensor arrays 505 after a step of separation.

As depicted in FIG. 3, an entire Wheatstone bridge array is provided, on a substrate of silicon having an oxide layer, with the piezoresistors of the Wheatstone bridge array deposited thereon. The oxide layer provides isolation between the silicon and the sensing devices. The use of dielectric isolation enables the sensor bridge to function at very high temperatures without any current leakage effects, in contrast to pn junction type devices.

A sensor array in accordance with the invention has many advantages over prior art devices, including the exemplary advantages described herein. In a sensor array in accordance with an embodiment of the invention, the geometry of the individual sensor elements may be defined by photolithographic techniques, so that the widths and thicknesses of the sensors can be on the order of fractions of a mil; as a result, very compact sensors can be formed. As each piezoresistive sensor may be made of a series of P+ regions of width of about 0.1 mils, a thickness of about 0.05 mils and lengths of about 7.5 mils, each sensor may have a relatively high resistivity. For example, each back and forth leg of a sensor, with P+ doping densities of above $10^{20}$ boron atoms/cm$^3$, may have a resistance in excess of 350 ohms. Since the separation of the legs may be on the order of 1 mil, and there may be, for example, 5 back and forth legs in a single sensor, such a sensor may provide a resistance in excess 2000 ohms in a width of less than 5 mils. Such a high resistance reduces self heating and thus provides a more stable transducer.

While the foregoing invention has been described with reference to the above embodiments, various modifications and changes can be made without departing from the spirit of the invention. Accordingly, all such modifications and changes are considered to be within the scope of the appended claims.

What is claimed is:

1. A pressure transducer, comprising:
   a diaphragm, having an active region, and capable of deflecting when a force is applied to said diaphragm,
   a sensor array disposed on a single substrate, said substrate secured to said diaphragm,
   said sensor array having a first outer sensor near an edge of said diaphragm at a first location and on said active region, a second outer sensor near an edge of said diaphragm at a second location and on said active region, and at least one center sensor overlying a center of said diaphragm, said sensors connected in a bridge array to provide an output voltage proportional to said force applied to said diaphragm.

2. The pressure transducer according to claim 1, wherein said substrate is a wafer of silicon, and each of said sensors is a P+ piezoresistor.

3. The pressure transducer according to claim 1, further comprising a second center sensor substantially overlying the center of said diaphragm, wherein each of said sensors is a piezoresistive sensor, said sensors being interconnected to define a Wheatstone bridge.

4. The pressure transducer according to claim 1, wherein said diaphragm comprises an end wall of a closed cylinder.

5. A pressure transducer, comprising:
   a diaphragm, having an active region, and capable of deflecting when a force is applied to said diaphragm,
   a sensor array disposed on a single substrate, said substrate secured to said diaphragm, said sensor array having a first outer sensor near an edge of said diaphragm at a first location and on said active region, a second outer sensor near an edge of said diaphragm at a second location and on said active region, and at least one center sensor substantially overlying a center of said diaphragm, said sensors connected in a bridge array to provide an output voltage proportional to said force applied to said diaphragm;
   wherein said substrate is a wafer of silicon, and each of said sensors is a P+ piezoresistor positioned on an oxide layer, said oxide layer being on said silicon wafer.

6. The pressure transducer according to claim 5, further comprising a glass frit intermediate said wafer and said diaphragm.

7. A pressure transducer, comprising:
   a diaphragm, having an active region, and capable of deflecting when a force is applied to said diaphragm,
   a sensor array disposed on a single substrate, said substrate secured to said diaphragm, said sensor array having a first outer sensor near an edge of said diaphragm at a first location and on said active region, a second outer sensor near an edge of said diaphragm at a second location and on said active region, and at least one center sensor substantially overlying a center of said diaphragm, said sensors connected in a bridge array to provide an output voltage proportional to said force applied to said diaphragm;
   wherein said substrate has opposing ends, said first outer sensor being at one of said opposing ends and said second outer sensor being at the other of said opposing ends, said substrate having a main portion width and being relatively narrow at said opposing ends.

8. The pressure transducer according to claim 7, wherein said substrate has a center width less than said first width extending along the length of said center sensors.

9. A pressure transducer, comprising:
   a diaphragm, having an active region, and capable of deflecting when a force is applied to said diaphragm,
   a sensor array disposed on a single substrate, said substrate secured to said diaphragm, said sensor array having a first outer sensor near an edge of said diaphragm at a first location and on said active region, a second outer sensor near an edge of said diaphragm at a second location and on said active region, and at least one center sensor substantially overlying a center of said diaphragm, said sensors connected in a bridge array to provide an output voltage proportional to said force applied to said diaphragm;
   wherein said diaphragm comprises an end wall of a closed cylinder and is metal.

* * * * *